(12) United States Patent
Genuardi et al.

(10) Patent No.: US 12,695,527 B2
(45) Date of Patent: Jul. 28, 2026

(54) METHOD AND APPARATUS FOR MODULATED SIGNAL IDENTIFICATION

(71) Applicant: Multiverse Computing S.L., Donostia-San Sebastián (ES)

(72) Inventors: Alessandro Genuardi, Donostia-San Sebastián (ES); Nilotpal Sinha, Donostia-San Sebastián (ES); Luc Andrea, Paris (FR); Samuel Mugel, Toronto (CA); Roman Orus, Donostia-San Sebastián (ES)

(73) Assignee: MULTIVERSE COMPUTING S.L., Donostia-San Sebastián (ES)

( * ) Notice: Subject to any disclaimer, the term of this patent is extended or adjusted under 35 U.S.C. 154(b) by 15 days.

(21) Appl. No.: 18/933,769

(22) Filed: Oct. 31, 2024

(65) Prior Publication Data

US 2026/0095268 A1 Apr. 2, 2026

(30) Foreign Application Priority Data

Sep. 27, 2024 (EP) .................................... 24383042

(51) Int. Cl.
H04B 17/391 (2015.01)
H04B 17/23 (2015.01)

(52) U.S. Cl.
CPC ......... H04B 17/3913 (2015.01); H04B 17/23 (2015.01)

(58) Field of Classification Search
CPC .. H04B 17/30; H04B 17/391; H04B 17/3913; H04B 17/20; H04B 17/23; G06F 30/20;
(Continued)

(56) References Cited

U.S. PATENT DOCUMENTS 5,630,210 A * 5/1997 Marry .................. H04B 1/1027
455/226.4
5,809,414 A * 9/1998 Coverdale ............ H04B 17/309
455/403
(Continued)

OTHER PUBLICATIONS

Thomas Courtat and Hélion du Mas des Bourboux, "A light neural network for modulation detection under impairments"(arXiv preprint arXiv: 2003.12260, Nov. 26, 2021).
(Continued)

*Primary Examiner* — James M Perez
(74) *Attorney, Agent, or Firm* — MUNCY, GEISSLER, OLDS & LOWE, P.C.

(57) ABSTRACT

A computer-implemented method and an apparatus for automatic modulation recognition that enables the detection and identification of modulation schemes in received raw signals with a signal receiving unit without prior information about the raw signal detail, comprising a computing unit configured to transform received raw signals from time domain to frequency domain including the noise in the signal with segmenting the signal and computing its modulation in multiple image with the spectrogram extraction process in order to capture temporal dependencies and sequential information by treating the raw signals as images; augmentation of the data for increasing the dataset size for increasing the accuracy with the limited data; training the data for enabling the network to learn spatiotemporal relationships based on a signal-to-noise ratio level; applying the data to one algorithm of two, which are convolutional neural network and convolutional neural network long short-term memory network hybrid algorithm.

13 Claims, 8 Drawing Sheets

(58) Field of Classification Search

CPC .. G06F 30/27; G06F 2207/38; G06F 2207/48; G06F 2207/4802; G06F 2207/4818; G06F 2207/4824; G06F 18/20; G06F 18/21; G06F 18/214; G06F 18/2155; G06F 18/217; G06N 7/00; G06N 7/02; G06N 7/04; G06N 7/046

See application file for complete search history.

(56) References Cited

U.S. PATENT DOCUMENTS

| | | | | |
|---|---|---|---|---|
| 5,983,080 | A * | 11/1999 | Gerszberg | H04B 17/318 |
| | | | | 455/226.2 |
| 6,134,445 | A * | 10/2000 | Gould | H04W 24/00 |
| | | | | 455/158.5 |
| 6,850,735 | B2 * | 2/2005 | Sugar | H04B 17/309 |
| | | | | 455/67.11 |
| 7,035,593 | B2 * | 4/2006 | Miller | H04W 16/14 |
| | | | | 455/67.11 |
| 7,116,943 | B2 * | 10/2006 | Sugar | H04L 1/1664 |
| | | | | 455/67.11 |
| 7,151,790 | B1 * | 12/2006 | Patenaude | H04B 1/7156 |
| | | | | 375/132 |
| 7,171,161 | B2 * | 1/2007 | Miller | H04L 27/0012 |
| | | | | 455/67.11 |
| 7,477,780 | B2 * | 1/2009 | Boncyk | H04N 1/00827 |
| | | | | 707/E17.023 |
| 8,879,998 | B2 * | 11/2014 | Prather | H04B 17/345 |
| | | | | 455/67.11 |
| 9,100,122 | B2 * | 8/2015 | VanPatten | H04B 17/3913 |
| 10,348,341 | B2 * | 7/2019 | Weissman | H04B 1/0475 |
| 10,665,222 | B2 * | 5/2020 | Bang | G10L 25/03 |
| 11,562,224 | B2 * | 1/2023 | Wu | G06N 3/08 |
| 11,816,392 | B2 * | 11/2023 | Woods | G10L 25/24 |
| 11,934,918 | B2 * | 3/2024 | Del Bimbo | G06N 10/00 |
| 12,212,974 | B2 * | 1/2025 | Montalvo | G06F 30/27 |
| 12,262,211 | B2 * | 3/2025 | Montalvo | G06N 20/00 |
| 12,262,213 | B2 * | 3/2025 | Montalvo | G06N 20/00 |
| 12,262,215 | B2 * | 3/2025 | Montalvo | G06F 30/27 |
| 12,309,599 | B2 * | 5/2025 | Montalvo | G06F 30/27 |
| 12,335,742 | B2 * | 6/2025 | Montalvo | G06N 20/00 |
| 12,389,232 | B2 * | 8/2025 | Montalvo | G06F 30/27 |
| 12,436,729 | B2 * | 10/2025 | Clark | G16H 20/30 |
| 12,439,263 | B2 * | 10/2025 | Montalvo | G06N 20/00 |
| 12,452,681 | B2 * | 10/2025 | Montalvo | G06N 20/00 |
| 12,477,349 | B1 * | 11/2025 | Montalvo | H04W 16/10 |
| 12,501,271 | B2 * | 12/2025 | Montalvo | G06F 30/27 |
| 2009/0141986 | A1 * | 6/2009 | Boncyk | G06F 16/29 |
| | | | | 382/209 |
| 2012/0315860 | A1 * | 12/2012 | Prather | H04B 17/382 |
| | | | | 455/67.13 |
| 2013/0265435 | A1 * | 10/2013 | Boncyk | G06F 16/5854 |
| | | | | 348/158 |
| 2013/0309987 | A1 * | 11/2013 | VanPatten | H04B 17/3913 |
| | | | | 455/226.2 |
| 2014/0242917 | A1 * | 8/2014 | Prather | H04B 17/23 |
| | | | | 455/67.13 |
| 2014/0316726 | A1 * | 10/2014 | Franchet | G01R 31/11 |
| | | | | 702/59 |
| 2019/0043477 | A1 * | 2/2019 | Bang | G10L 15/20 |
| 2020/0124650 | A1 * | 4/2020 | Zheng | H01S 3/08086 |
| 2021/0126723 | A1 * | 4/2021 | Foster | H04B 17/318 |
| 2023/0073174 | A1 * | 3/2023 | Clark | G16H 20/30 |
| 2023/0230611 | A1 * | 7/2023 | Chopra | G10L 19/005 |
| | | | | 704/202 |
| 2023/0387935 | A1 * | 11/2023 | Bikkina | H03M 1/20 |
| 2023/0409665 | A1 * | 12/2023 | Palmer | G06F 17/16 |
| 2023/0409961 | A1 * | 12/2023 | Hsing | G06N 20/10 |
| 2024/0160899 | A1 * | 5/2024 | Jahromi | G06N 3/044 |
| 2024/0397328 | A1 * | 11/2024 | Montalvo | G06N 20/00 |
| 2024/0414549 | A1 * | 12/2024 | Montalvo | G06N 20/00 |
| 2024/0414551 | A1 * | 12/2024 | Montalvo | G06N 20/00 |
| 2024/0422556 | A1 * | 12/2024 | Montalvo | G06F 30/27 |
| 2024/0422558 | A1 * | 12/2024 | Montalvo | G06F 30/27 |
| 2024/0422560 | A1 * | 12/2024 | Montalvo | G06F 30/27 |
| 2025/0080993 | A1 * | 3/2025 | Montalvo | G06F 30/27 |
| 2025/0086144 | A1 * | 3/2025 | Orús | G06F 16/1744 |
| 2025/0123347 | A1 * | 4/2025 | Calderon Rico | G01R 33/5608 |
| 2025/0184749 | A1 * | 6/2025 | Montalvo | G06F 30/27 |
| 2025/0184750 | A1 * | 6/2025 | Montalvo | G06N 20/00 |
| 2025/0203378 | A1 * | 6/2025 | Montalvo | G06N 20/00 |
| 2025/0209131 | A1 * | 6/2025 | Orús | G06N 10/60 |
| 2025/0240638 | A1 * | 7/2025 | Montalvo | G06F 30/27 |
| 2025/0274770 | A1 * | 8/2025 | Montalvo | G06N 20/00 |
| 2025/0285614 | A1 * | 9/2025 | Tyagi | G10L 15/16 |
| 2025/0324273 | A1 * | 10/2025 | Montalvo | G06F 30/27 |
| 2025/0338133 | A1 * | 10/2025 | Montalvo | H04W 16/10 |
| 2025/0358628 | A1 * | 11/2025 | Montalvo | G06N 5/04 |
| 2025/0374064 | A1 * | 12/2025 | Montalvo | G06F 30/27 |
| 2025/0386202 | A1 * | 12/2025 | Montalvo | G06N 20/00 |

OTHER PUBLICATIONS

Jialang Xu et al, "A Spatiotemporal Multi-Channel Learning Framework for Automatic Modulation Recognition"(IEEE Wireless Communications, vol. 9, Issue 10, Jun. 2, 2020).

Fuxin Zhang et al. "Deep Learning Based Automatic Modulation Recognition: Models, Datasets, and Challenges". In: arXiv preprint arXiv:2207.09647 (2022). Deep Learning Based Automatic Modulation Recognition: Models, Datasets, and Challenges. url: https://arxiv.org/abs/2207.09647.

Grover Suhani et al: "Detection and Classification of Pulsed Doppler Radar Signals Using Deep Learning", 2024 International Conference on Global Aeronautical Engineering and Satellite Technology (GAST), IEEE, Apr. 24, 2024 (Apr. 24, 2024), pp. 1-6, DOI: 10.1109/GAST60528.2024.10520762.

* cited by examiner

METHOD AND APPARATUS FOR MODULATED SIGNAL IDENTIFICATION

CROSS-REFERENCE TO RELATED APPLICATIONS

This application claims priority of the European Patent Application number EP 24383042.9 filed on 27 Sep. 2024. The entire disclosure of the European Patent Application number EP 24383042.9 is hereby incorporated herein by reference.

TECHNICAL FIELD

The present disclosure relates to the field of machine learning and artificial intelligence, specifically to methods and apparatus for automatic modulation recognition system, which includes temporal and sequential data that fast, accurate, and designed for resource-constrained environments that processes using hybrid algorithms. This includes the controlled selection and application of a 2D Convolutional Neural Network (2D-CNN) in conjunction with a Long Short-Term Memory (LSTM) network to capture both spatial and temporal dependencies in sequential data.

Specifically, but without limitation, the disclosure pertains to recognition of modulated signals, especially optimized for operation in environments with limited data, storage, and processing capabilities, making it well-suited for on-edge applications.

BACKGROUND

Automatic Modulation Recognition (AMR) is an advanced signal processing technology that identifies the modulation type of a received signal automatically, without prior information about the signal's modulation scheme. The modulation process varies one or more aspects of a periodic waveform such as amplitude, frequency, or phase, to encode information, which is a fundamental operation in communication systems. These systems must identify modulation types in real-time to ensure efficient signal processing and data transmission.

The primary applications of AMR include cognitive radio, electronic warfare, and spectrum monitoring. Industries that demand fast and efficient response time for signal recognition require solutions that are lightweight, accurate, and fast methods that runs on systems. This is particularly crucial in military signal intelligence, where quickly and precisely identifying and classifying enemy signals is of utmost critical. Additionally, integrating these detection mechanisms directly into a (air)craft or a vehicle system can significantly reduce data analysis time compared to scenarios where data must be sent to a remote analysis center and await a response.

Hence, this solution is applicable across domains where signal data acquisition is scarce, and swift and reliable signal processing is critical, such as in SIGINT.

In state of the art, Existing AMR technologies leverage advanced algorithms and neural networks for feature extraction and classification, as demonstrated by Thomas Courtat and Hélion du Mas des Bourboux, "A light neural network for modulation detection under impairments" (arXiv preprint arXiv: 2003.12260, 26 Nov. 2021); and Jialang Xu et al, "ASpatiotemporal Multi-Channel Learning Framework for Automatic Modulation Recognition" (IEEE Wireless Communications, Vol 9, Issue 10, 2 Jun. 2020). These systems achieve high recognition accuracy but do not meet current technological needs for speed, small size, and low energy consumption.

Fuxin Zhang et al. "Deep Learning Based Automatic Modulation Recognition: Models, Datasets, and Challenges". In: arXiv preprint arXiv:2207.09647 (2022). Deep Learning Based Automatic Modulation Recognition: Models, Datasets, and Challenges. url: https://arxiv.org/abs/2207.09647 explains the integration of deep learning (DL) techniques into AMR, the resulting models, can create significantly enhanced AMR systems. However, DL-based approaches use deep neural networks (DNNs) to extract robust features from signal data, improving recognition accuracy and reducing false alarm rates. Also, these models often face challenges related to computational complexity and model explainability, limiting their practical deployment.

Patent document US20180357542A1 explains signal classification method with 1D-CNN, which applies convolutional filters along the time dimension, which helps in extracting local patterns. However, this method does not adequately address the need for spatiotemporal learning and fast results in lightweight systems with limited resources while maintaining high accuracy.

As a result, all the problems listed above require innovation in the relevant field.

SUMMARY

The present disclosure aims to eliminate the abovementioned problems and to make a development in the relevant technical field.

The present disclosure provides a novel computer-implemented method and an apparatus for processing sequential data on received modulation signals by applying a hybrid architecture combining a 2D-CNN and an LSTM network. This method is designed to capture both spatial dependencies through the 2D-CNN and temporal dependencies using the LSTM, thus improving the accuracy of predictions in tasks requiring sequential data analysis. The method also includes decision step which can be defined as selection between 2D-CNN and 2D-CNN+LSTM hybrid algorithm within predefined signal-to-noise ratio (SNR). Thus, provides more accurate analysis within the small processing capacity.

An objective of the disclosure, create a method can run on an environment, which has lightweight structure with limited processing capabilities with low energy consumption that can classify the modulation signals. Example for most used in the field of radar and telecommunication:

No Modulation (NM): Pulse without any modulation.

Linear Frequency Modulation (LFM): The pulse rate varies linearly.

Dual LFM (DLFM): Union of two identical LFMs, one increasing and the other decreasing, or vice versa.

Multiple LFM (MLFM): Similar to DLFM modulation but without the need for them to be identical.

Even Quadratic Frequency Modulation (EQFM): Modulation with quadratic evolution of the frequency and with a plane of symmetry in the center of the pulse.

Sinusoidal Frequency Modulation (SFM): Modulation with sinusoidal frequency variation.

Linear Frequency Shift Keying (LFSK): The frequency varies linearly, but in a discrete manner, generating a staircase frequency profile.

Coastal Codes: Discrete frequency modulation that follows a Costas code [wolff2024a].

Binary Frequency Shift Keying (BFSK): The frequency varies between two opposite values (usually 0 and 1) following a Barker code [wolff2024b].

Quadratic Frequency Shift Keying (QFSK): Similar to BFSK, but with 4 values.

Binary Phase Shift Keying (BPSK): Identical to BFSK modulation but referred to the pulse phase.

Quadratic Phase Shift Keying (QPSK): Similar to QFSK but referred to the phase.

Frank: Modulation characterized by the discrete variation of the phase following a homonymous code [wolff2024c].

P1: Phase modulation similar to LFSK.

P2: LFSK modulation that includes phase jumps between frequency jumps.

P3: Phase modulation similar to a DLFM.

P4: Phase modulation similar to an LFM.

Huffman: Amplitude and phase modulation governed by a Barker code.

LFM-BPSK: Combination of both modulations.

According to the subject matter method and apparatus, above mentioned signals can be classified with incorporating a lightweight neuron-based hybrid model that balance high performance with reduced computational demands.

Another objective of the disclosure, using minimum number of trainable parameters with achieving high accuracy. Thus, provides implementation on a photonic architecture.

Another objective of the disclosure, turning the time-series analysis into an image (2D static pattern) recognition task thus provides using alternative approaches in the technical field.

Another objective of the disclosure, enhancing robustness of the models against noise and other signal distortions with the preserving the physical characteristics of the data with the data augmentation process.

Another objective of the disclosure, refining the method and apparatus to achieve state-of-the-art performance without increasing its complexity by adding more neurons, layers, or advanced architectures, as explored by existing solutions. The augmentation process provides this advantage.

Another objective of the disclosure, improving adaptability of the method to other in diverse and challenging environments with augmentation process. (for example, over-the-air (OTA) data.

Another objective of the disclosure, create an adaptive method for both low noise environments and high noise environments.

Another objective of the invention, using 1D real vector which becomes spectrogram with the CTFT rather than using I/O signals, which are two complex 1D vectors. Thus, provides lightweight solution that can be run on small architectures like photonic circuits.

BRIEF DESCRIPTION OF THE DISCLOSURE

The disclosure is related to a computer-implemented method and an apparatus for modulated signal identification to fulfil one, some or all aims mentioned above and will be obtained from the following detailed description. The disclosure is also related to: data processing systems with means for carrying out the methods; computer program products comprising instructions which, when the program products are executed by at least one computing unit, cause the at least one computing unit to carry out the methods; and computer-readable data carrier having stored there on the computer program products, which may be computer-readable non-transitory storage mediums in some examples.

The convolutional neural network (CNN) can identify spatial patterns and directly process signals in the time-frequency domain. The convolutional layer, as it is mainly tasked with extracting critical features from the input signal. The quality of these features is largely shaped by the design of the convolutional kernels within the convolution and pooling layers, which are tailored according to the data structure and specific classification objectives.

Convolution kernels of different sizes can be utilized to extract intra-periodic features and features across adjacent periods, combining the cell state and hidden layer state. The cell state captures long-term information, while the hidden layer state conveys the selected output information. By integrating both methods into a hybrid model, it becomes possible to learn more complex spatiotemporal relationships within the data, leading to improved performance during training.

Disclosure shows that multiple algorithms reaction of the different kind of modulation signal. Especially convolutional neural network, working properly on the signal. However, if there is noise on the signal CNN accuracy is decreasing fast. FIG. 7 shows also this comparison. With the subject matter method, one of them between CNN and hybrid algorithm selectable. Hybrid algorithm also adapted to not affect from noise.

In accordance with embodiments, a computer-implemented method for automatic modulation recognition that enables the detection and identification of modulation schemes in received raw signals with a signal receiving unit without prior information about the raw signal detail, characterized by; comprising at least one computing unit configured to achieve following steps:

transforming received raw signals from time domain to frequency domain including the noise in the signal with segmenting the signal and computing its modulation in multiple images with the spectrogram extraction process in order to capture temporal dependencies and sequential information by treating the raw signals received from signal receiving unit (70) as images;

augmentation of the data for increasing the dataset size for increasing the accuracy with the limited data;

training the data for enabling the network to learn spatiotemporal relationships based on a predefined or a precalculated signal-to-noise ratio (SNR) level;

applying the data to one algorithm of two, which are two-dimension convolutional neural network (2D-CNN) and two-dimension convolutional neural network (2D-CNN) long short-term memory network (LSTM) hybrid algorithm.

Another embodiment of the disclosure, the method includes time-frequency spectrogram conversation established with Cohen's Time Frequency Transform (CTFT).

Another embodiment of the disclosure, the method includes time-frequency spectrogram conversation established with Choi-Williams distribution (CWD) of Cohen transform. According to this, signal analysis can be captured time-varying frequency and transformations can be analyzable with detailed and noise-resistant. Characterization of the kernel function employed with predefined Alpha ($\alpha$) and Beta ($\beta$) parameters which are controls time resolution and frequency resolution of the distribution. Kernel function is exponential, and a can control how much smoothing is applied along the time axis, while $\beta$ controls smoothing along the frequency axis. The kernel's adaptability makes the distribution well-suited for signals, where reducing interference without sacrificing too much resolution is essential. Combination of the Cohen's Time Frequency Transform and Choi-Williams distribution, which is a specific member of Cohen's class provides continuous frequency domain information with fine-tuned trade-off between time accuracy and frequency accuracy.

Another embodiment of the disclosure, the method applies a Cohen transform to mitigate the signal noise during preprocessing for obtaining the spectrogram of the digital signal of the modulated pulse. Also provides detailed examination of how signal's frequency content changes over time for non-stationary signals. After the transform process, the signal contains frequency, phase and power density information during the time interval covered by the RADAR signal pulse.

Another embodiment of the disclosure, the method includes control unit utilizes principal component analysis for transfer learning and dimensionality reduction where insufficient labelled samples in the dataset.

Another embodiment of the disclosure, the method includes tensorization step to compress the model size within the memory medium for least one of the two algorithms, which at least two-dimension convolutional neural network (CNN) and at least two-dimension convolutional neural network (2D-CNN) long short-term memory network (LSTM) hybrid algorithm.

Another embodiment of the disclosure, the method tensorizes the convolutional neural network algorithm with factorizing weight tensors to a classification layer of the convolutional neural network, thereby generating an improved convolutional neural network.

Another embodiment of the disclosure, the method includes outlier data detection analysis step, which utilizes by control unit as accuracy per sample versus sample number before the data augmentation.

Another embodiment of the disclosure, the method includes the data augmentation step that targets detected outlier data.

Another embodiment of the disclosure, the method includes a step for training the hybrid model using a dataset with temporal sequences, wherein the loss function is optimized to minimize both spatial and temporal prediction errors.

Another embodiment of the disclosure, the method classifies signal data based on both the spatial features of individual frames and the temporal dependencies across frames in the spectrograms.

According to the disclosure, the apparatus for automatic modulation recognition that enables the detection and identification of modulation schemes in received signals with a signal receiving unit without pre-defined prior information about the signal details comprising; at least one at least one signal receiving unit that receives the raw signals, and at least one computing unit that coupled to at least one memory medium; transform unit that transforms the raw signals from time domain to frequency domain with Cohen's Time Frequency Transform (CTFT) with combining Cohen's Class; at least one augmentation unit that enlarges of the data for increasing the dataset size for increasing the accuracy with the limited data; wherein the computing unit also includes an accuracy module that configured to training the data for enabling the network to learn more intricate spatiotemporal relationships with treating the signals as images that applies two-dimensional convolutional neural network (2D-CNN) model; a general module that configured to capture temporal dependencies and sequential information on the spectrogram that applies two-dimensional convolutional neural network (2D-CNN) and long short-term memory network (LSTM) hybrid algorithm; a decision unit that configured to selecting one of the accuracy module and general module for increase the accuracy according to the signal-to-noise ratio (SNR) level which is predefined input of the apparatus.

According to the disclosure, spatiotemporal refers to both spatial and temporal dimensions that occur over both space and time. Spatial features are signal shapes/patterns which are captured from spectrograms, temporal relations are changing this features in time/frequency (spatial features between the frames).

Current architectures do not allow for efficient implementation on alternative analog computing devices for automatic modulation recognition application. According to the method, which can achieve lightspeed at an unmatched efficiency, implementation on photonic circuits can be done easily. According to the results of the simulations model training speed gain: 1000×–250×, model storage reduction: 17×-256×. Thus, provides lightweight application can be implemented on controllers or processors, which are limited capability.

In preferred embodiments, the control unit employs principal component analysis for transfer learning and dimensionality reduction where insufficient labelled samples in the dataset. The control unit applies the data augmentation that targets detected outlier data only with transformation in frequency axis. Thus, provides preservation of temporal structure with remaining intact to the time-domain characteristics.

In different embodiments, the control unit employs principal component analysis for transfer learning and dimensionality reduction where insufficient labelled samples in the dataset. In certain embodiments, the control unit executes outlier data detection analysis as accuracy per sample versus sample number before the data augmentation. In certain embodiments, the control unit applies the data augmentation that targets detected outlier data. In certain embodiments, the control unit applies data augmentation only with transformation in frequency axis.

The protection scope of the disclosure is specified in the claims and cannot be limited to the description made for illustrative purposes in this brief and detailed description. It is clear that a person skilled in the art can present similar embodiments in the light of the above and following descriptions without departing from the main theme of the disclosure.

DESCRIPTION OF THE REFERENCE NUMBERS ILLUSTRATED IN THE FIGURES

Figure 1:
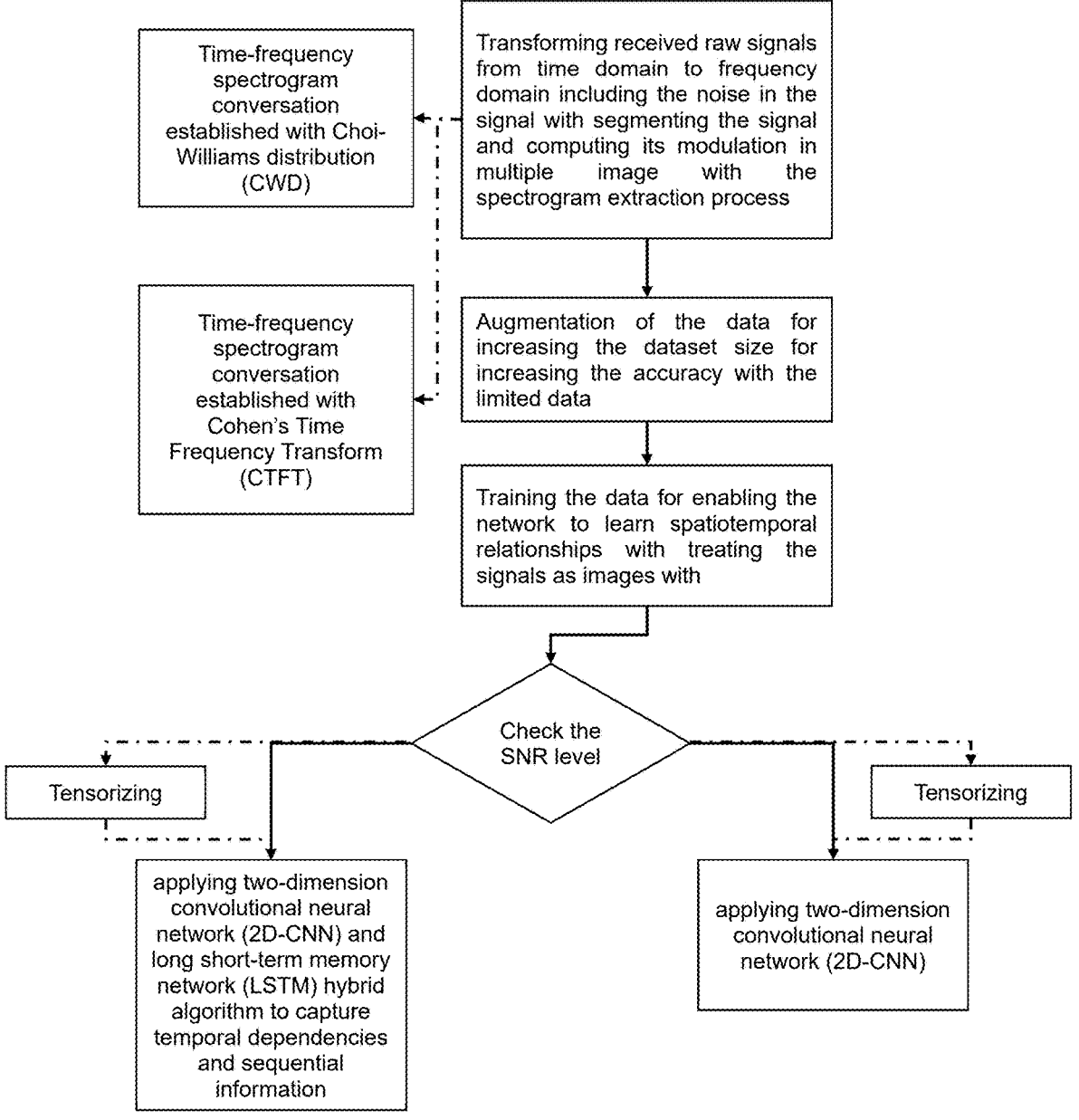
FIG. 1 illustrates in a flowchart that shows the steps of a method in accordance with one embodiments of the disclosure.
Figure 2:
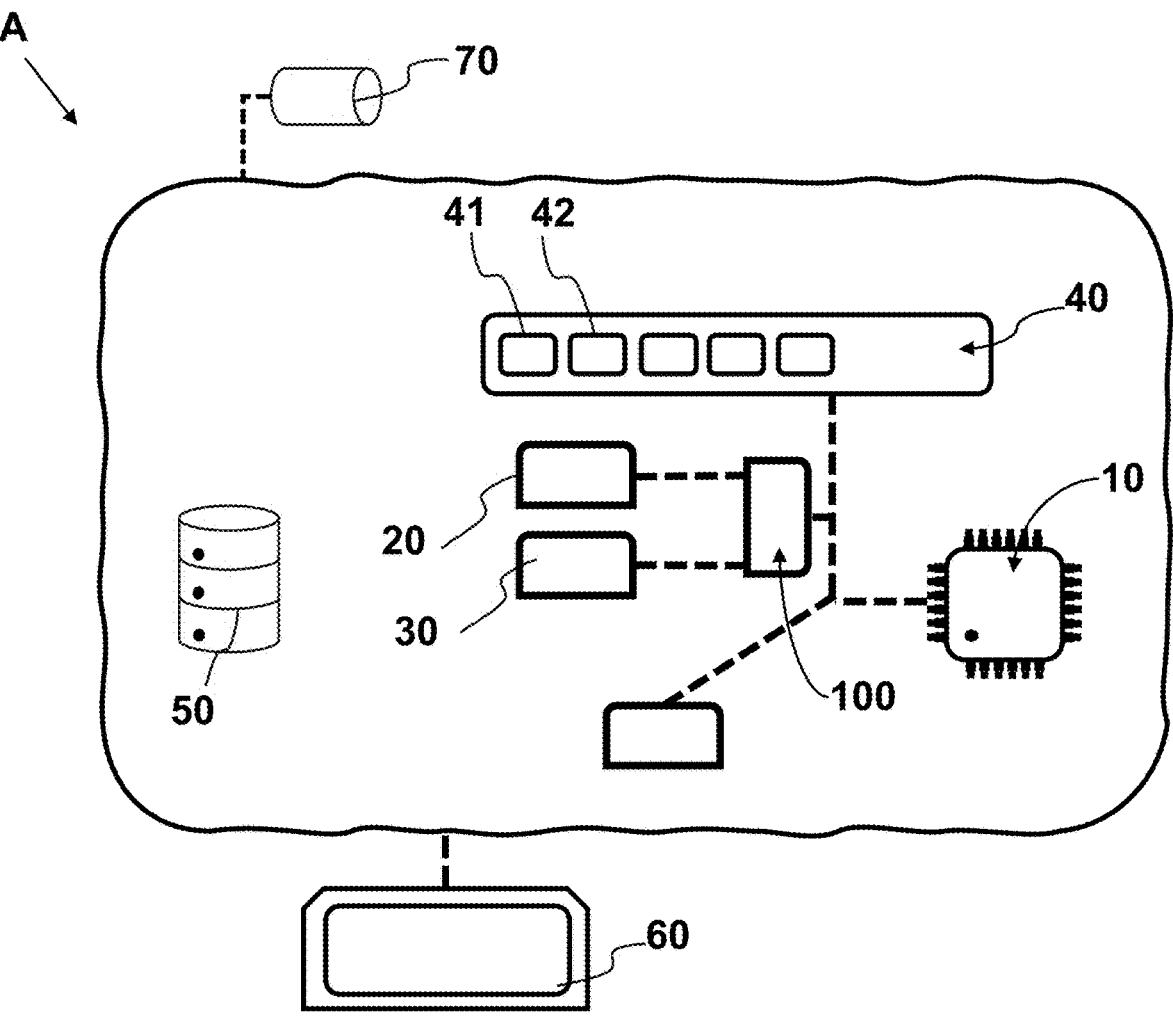
FIG. 2 represents some embodiments of the apparatus.

10. Computing unit
    100. Decision unit
20. Accuracy module
30. General module
40. Pre-Processing module
    41. Transform unit
    42. Augmentation unit
50. Memory medium
60. Human interface unit
70. Signal receiving unit
A. Apparatus

DETAILED DESCRIPTION

In this detailed description, apparatus (A) and method for modulated signal identification is described by means of examples only for clarifying the subject matter without any limitation of the scope of the disclosure.

A computer-implemented method for automatic modulation recognition that enables the detection and identification of modulation schemes in received raw signals with a signal receiving unit (70) without prior information about the raw signal detail, characterized by; comprising at least one computing unit (10) configured to achieve following steps:

transforming received raw signals from time domain to frequency domain including the noise in the signal with segmenting the signal and computing its modulation in multiple images with the spectrogram extraction process in order to capture temporal dependencies and sequential information by treating the raw signals received from signal receiving unit (70) as images;

augmentation of the data for increasing the dataset size for increasing the accuracy with the limited data;

training the data for enabling the network to learn spatiotemporal relationships based on a predefined or a precalculated signal-to-noise ratio (SNR) level;

applying the data to one algorithm of two, which are at least one-dimension convolutional neural network (CNN) and at least one-dimension convolutional neural network (CNN) long short-term memory network (LSTM) hybrid algorithm.

Figure 3A:
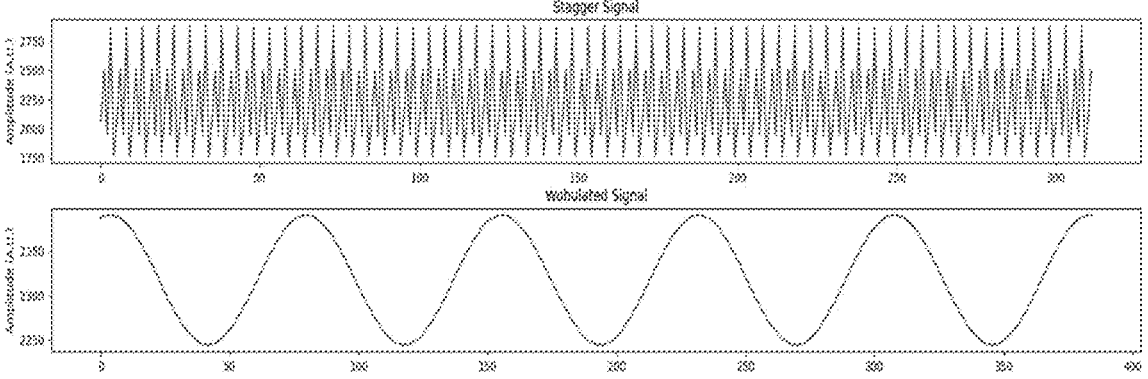
FIG. 3A illustrates an example of inter-pulse signal.
Figure 3B:
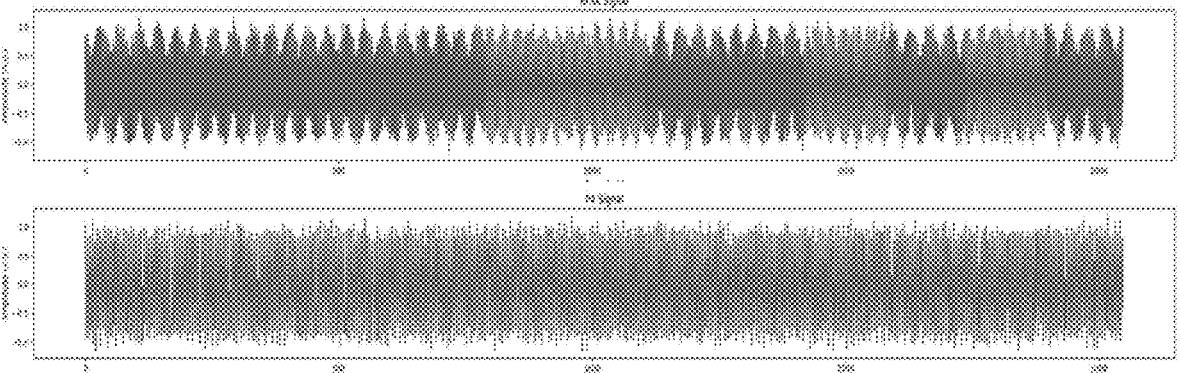
FIG. 3B illustrates an example of intra-pulse signal.
Figure 4A:
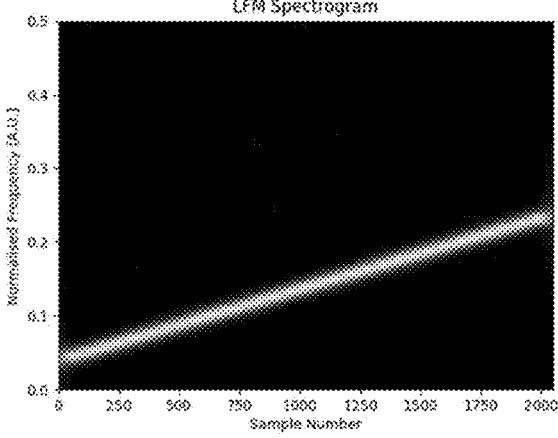
FIGS. 4A, 4B, 4C and 4D example of intra-pulse signals which are accordingly LFM, BFSK, P2 and P4, respectively.
Figure 4B:
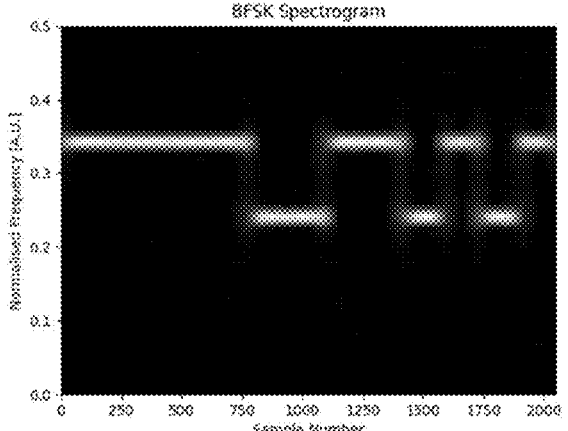
Figure 4C:
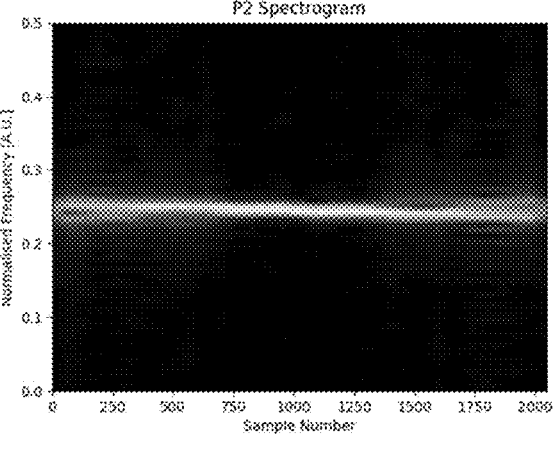
Figure 4D:
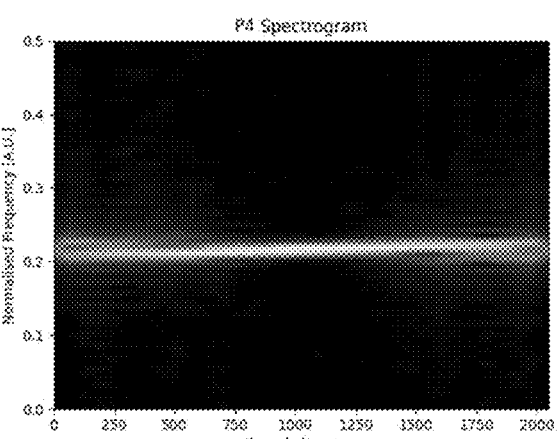

FIG. 3A shows an example of inter-pulse signal and FIG. 3B shows an example of intra-pulse signal. Intra-pulse signals are higher variations withing the same class and greater susceptibility to noise. This distinguishing feature made more apparent with conversation of the raw signal to a time-frequency spectrogram. In preferred embodiment of the invention, thus established one or combination of at least two methods, which they are Short-Time Fourier Transform (STFT), Cohen's Time Frequency Transform (CTFT), Choi-Williams distribution (CWD), bilinear transform. This step involves segmenting the signal and computing its modulation in n-steps. In preferred embodiment of the method, for the providing balance between speed and accuracy, time-frequency spectrogram conversation accomplished with STFT Thus, provides window size post-training with small images whit fast learning time. FIG. 4A-D shows mentioned and become more apparent distinguishing features.

Augmentation process employed for increasing the dataset size of limited data. Thus, provides increasing the accuracy with the limited data. In preferred embodiment of the method, enriching the dataset employed by generation virtual data with Generative Adversarial Networks (GANs).

In preferred embodiment of the method, one or two of the steps—cropping, concatenation, or noise—can be applied individually or in combination to expanding the training samples. Thus, prevents memorizing side effects of the algorithm with limited data.

In preferred embodiment of the method, Principal Component Analysis (PCA) step is established for reducing the feature space and enhance discernibility.

In preferred embodiment of the method, detecting outliers in a dataset using Principal Component Analysis (PCA) established with following steps;

standardizing the input dataset to ensure that all variables contribute equally, thereby accounting for differences in the scale of the variables;

applying Principal Component Analysis to decompose the dataset into a plurality of principal components, each principal component representing a direction of maximum variance within the dataset;

projecting the dataset onto the space defined by the selected principal components, wherein each data point is transformed into a reduced-dimensional representation;

reconstructing the original dataset from the projected data points and calculating a reconstruction error for each data point, wherein the reconstruction error is the difference between the original data point and its corresponding projection in the reduced-dimensional space;

Setting a predefined threshold for the reconstruction error, wherein data points having a reconstruction error exceeding the threshold are identified as outliers.

In a preferred embodiment of the method, training the data for enabling the network to be treating the signals as images or videos and applying two-dimension convolutional neural network (2D-CNN) managed. So, wave signals treated as a video image that transformed with received raw signals from time domain to frequency domain. According to the method, each frequency point represents a spatial slice at a given time point. The network trained to recognize patterns across these frames that shows both the spatial and temporal features that can resolve with spectrograms that extracted time-frequency conversation with STFT.

Spatial Feature Extraction Using 2D Convolutional Neural Network (CNN):

The first stage of the method involves the use of a 2D-CNN for extracting spatial features from each frame of the input sequence that includes convolutional filters, which scan across the 2D input to capture local features, such as edges, textures, and shapes. Thus, provides identification of spatial patterns in the spectrograms. The output of the CNN is a set of feature maps that represent high-level abstractions of the spatial structure of each frame.

2D CNN includes convolutional layers, which applies multiple filters to each input frame on the spectrograms for allowing the network to detect spatial patterns. 2D-CNN also includes pooling layers that provides reducing the spatial dimensions of the feature maps. Thus, provides reducing the computing complexity. After the convolution process, pooling layers are applied to reduce the spatial dimensions of the feature maps, retaining essential information while reducing computational complexity. It creates final output for each frame that a condensed set of feature maps that preserve the most critical spatial information.

The model parameters belong in three categories: i) parameters in convolutional layers, $N_c$; ii) bias parameters, $N_b$; and iii) parameters of the classification (regression) layer, $N_r$; which can represented as: $N_{CNN}=N_c+N_b+N_r$.

In a preferred embodiment of the method, applying with two-dimension convolutional neural network (2D-CNN) and selecting long short-term memory network (LSTM) hybrid algorithm provides more accuracy within short time limit. Two-dimension convolutional neural network (2D-CNN) extracts spatial features from the spectrograms and long short-term memory network (LSTM) captures temporal dependencies Which are relationships between past and future events or states in a time series on the spectrograms. Thus, increases accuracy of the prediction and provides more robust analysis. Table 1 shows the results of the method with comparison with the other methods.

Figure 5A:
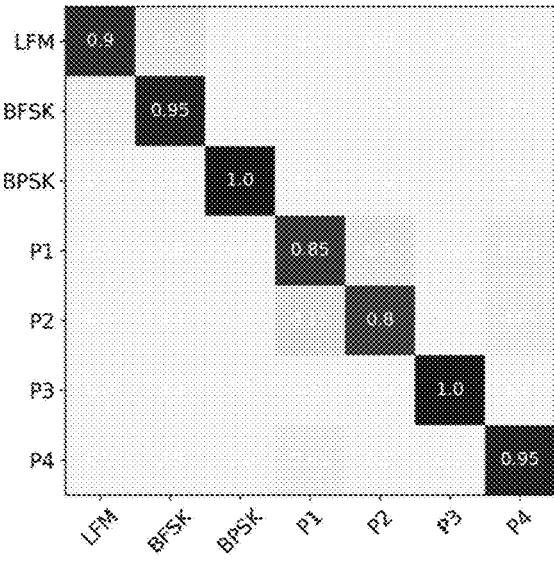
FIGS. 5A and 5B shows an example quadrilateral discretization with tensor networks.

Method involves using one step of two this are only two-dimension convolutional neural network (2D-CNN) or using hybrid step, which are two-dimension convolutional neural network (2D-CNN) and selecting long short-term memory network (LSTM). This selection managed by the controller based on the level of the noise. FIG. 5A shows the confusion matrices for intra-pulse signal.

In accordance with the disclosed embodiments, the method employs a hybrid architecture that integrates a 2D Convolutional Neural Network (CNN) with a Long Short-Term Memory (LSTM) network captures temporal dependencies and sequential information. This hybrid architecture is particularly well-suited for tasks involving sequential or time-dependent data, such as video processing which is transferred from raw signal to time series on the spectrograms, which are visual representations of the temporal data.

The method handles input data that consists of sequences, where each data point in the sequence is represented as a 2D frame, image, or spatial grid. In the case of analysis (of video), the input would be a series of frames over time.

2D-CNN, LSTM hybrid algorithm, the feature maps are fed into the LSTM network that extracted from the 2D-CNN. Thus, provides processing sequential data by maintaining a memory of previous time steps on the spectrograms. According to the disclosure, hybrid method links the information across different time steps and provides learning of the temporal dynamics of the sequence. According to this robust method, 2D-CNN focuses on spatial patterns in each frame independently, while the LSTM links these spatial features across time steps, learning the sequence's temporal structure.

In preferred embodiment of the method or apparatus (A), preferably decision unit (100) detects the signal-to-noise (SNR) ratio for selection between one of the algorithms between 2D-CNN and 2D-CNN, LSTM hybrid algorithm that employed with the control unit (10).

In preferred embodiment of the method, computing unit (10) has photonic architecture. Photonic computing unit (10) accelerates the matrix multiplications and convolutions involved in the method by performing these operations in parallel and at light speed. Thus, provides faster solution compared the other processors.

Figure 8:
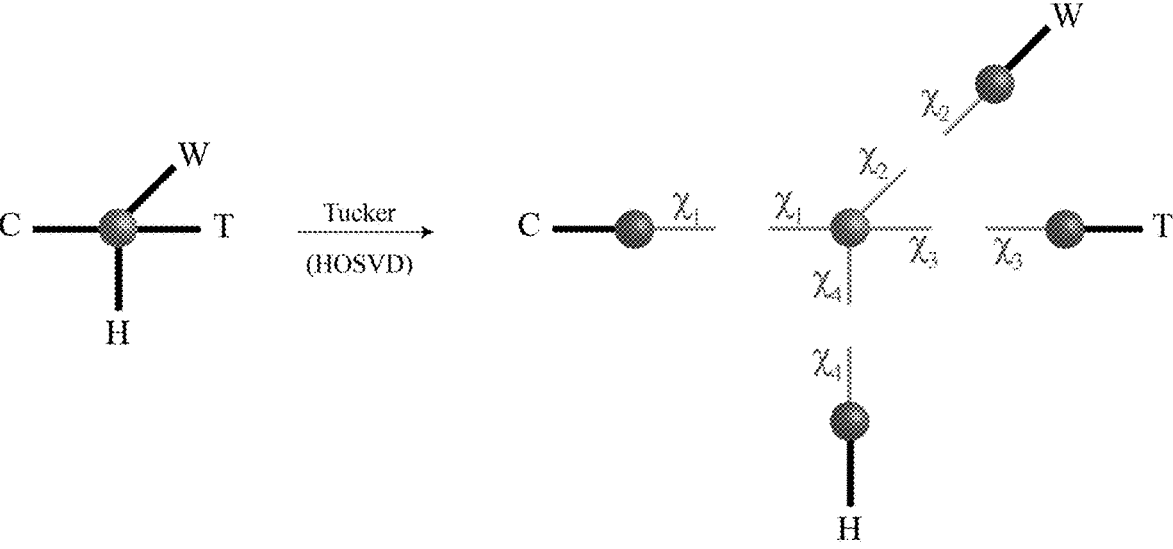
FIG. 8 shows tensor representation for alternative embodiment for the method.

In another embodiment of the method, a 2D-CNN is tensorized using Tucker decomposition. Each convolutional layer in the CNN includes a rank-4 weight tensor, as illustrated in FIG. 8. This tensorization compresses the model, significantly reducing its size. Given the large number and size of convolutional weight tensors, which result in numerous trainable parameters, the tensorized approach enables efficient storage of these parameters in memory and allows fine-tuning and training within a limited memory medium (50) and battery constraints. The convolutional weight tensors of the CNN can be reduced by factorizing the tensors, retaining the most relevant information learned by the network while eliminating the less significant components. This factorization is achieved through tensor decomposition, specifically using Tucker decomposition, where the original weight tensor is approximated by contracting a core tensor with four factor matrices. Each of these factor matrices is reduced in dimensionality, as shown in FIG. 8. Training of the Tensorized 2D-CNN, a single big rank-4 weight tensor is trained for each convolutional layer, whereas the latter involves updating four smaller factorized matrices and a core tensor within each layer. Once updated, the factorized matrices and the core tensors of each convolutional layer are contracted, and the information is fed to the next layer.

In preferred embodiment of the method, 2D-CNN trained and after tensorized with Tucker decomposition. This results in a model with one core tensor and four orthogonal factorized matrices. The four factorized matrices can be interpreted as the principal components in each dimension, whereas the core tensor would describe interactions between the different dimensions. Thus, provides key correlations in data are kept by taking the principal singular values of the Tucker decomposition while irrelevant parameters are truncated, resulting in a new tensor representation that defines a compressed parameter space where only essential information is retained.

In another preferred embodiment of the method, training model is defined with new tensor representation on the compressed parameter space, which has the advantage of accessing the compressed parameter space directly while having faster training times. In this embodiment, the trained model parameters are not the result of a Tucker decomposition directly, that found by optimizing the model in the new tensor representation compressed space directly. More specifically, the number of trainable parameters in the weight tensor of a convolutional layer (see FIG. 8—left) is $N_c = C \times W \times T \times H$. (The four dimensions of the convolution tensor, C, W, T, H correspond to the number of input channels (filters), output channels, width, and height of the features in that layer.) Four factorization ranks for the output dimension of the factor matrices which are upper bounded by the size of that dimension $X_1 \leq C$, $X_2 \leq W$, $X_3 \leq T$, $X_4 \leq H$. According to this, the total number of parameters in the factorized convolutional layers given as the sum of parameters of the four factor matrices and the parameters of the core tensors, which in total reads:

$$N_c^f = C \times x_1 + W \times x_2 + T \times x_3 + H \times x_4 + (x_1 \times x_2 \times x_3 \times x_4)$$

$$N_c^f$$

with the parameters of bias and the classification layer, which are defined on the memory medium (50) to run on the computing unit (10), tensorized convolutional neural network can be represented as $$N_{T\text{-}CNN} = N_c^f + N_b + N_r.$$

In another embodiment of the invention, tensorized 2D-CNN can be integrated with RNN, which has tensorized hidden layer similar to above mentioned tensorized CNN, and after modified to LSTM. Thus, provides compressed and low memory needs for the algorithm that can run on small resource. According to this embodiment, accuracy module (20) runs tensorized 2D-CNN and general module (30) runs tensorized LSTM with tensorized 2D-CNN. This embodiment provides compressed (small sized within a memory medium (50)) algorithm.

In preferred embodiment of the method, modifying tensorized RNN to LSTM, memory cell convolution, channel normalization steps occur. With expanded tensor volume with leveraging higher-dimensional tensors.

1. Simulation and Results

Modulated intra-pulse radar signals. These can be first divided into two kinds of pulse compression methods: Frequency Modulation (FM) and Phase Modulation (PM). From these, we choose for training and validation purposes the most common types: LFM, BPSK, BFSK; P1, P2, P3, P4.

The signal is exposed to noise and distortions, so a robust system should be able to output reliable predictions spanning a wide signal-to-noise ratio (SNR). In line with the literature, we choose a range from −20 dB to 20 dB. It is a logarithmic scale, so −20 dB means the noise is 100 times stronger than the signal, 0 dB that the signal is just as strong as the noise, and 20 dB means the signal is 100 times stronger than the noise. The stronger the noise, the harder to correctly classify.

All signals are labelled, but since labelling and access to data is a known difficulty in the field, we restricted the batch to 100 signals per class. Of these, 60 were used for training, 20 for validation, and 20 for testing.

The dataset includes 6 classes (all of the ones aforementioned) of inter-pulse raw signals, and 7 classes (LFM, BFSK, BPSK, P1, P2, P3, P4) of raw intra-pulse signals. There are 100 samples per class in both cases, with 425 features, that is, difference time of arrival (DTOA), for the inter-pulse, and 2048 features in the intra-pulse, that is the modulated signal over time. The sampling frequency can be then chosen arbitrarily. In terms of noise, we have spurious and dropped in the former case, meaning the signal is either shifted of its original amplitude, or it gets cut, while in the latter, we have white gaussian noise fixed at 20 dB.

Performance results of the method with comparison shown in table 1.

TABLE 1

| (No Data Augmentation) | | |
| --- | --- | --- |
| Category of Signal | Method | Accuracy (Parameters) |
| Inter-pulse | FP-FFNN | 98% (300 Parameters) |
| Intra-pulse | FFNN on Spectrograms with PCA | 75% (500 Parameters) |
| Intra-pulse | 1D-CNN on Raw Signals with PCA | 80% (30 000 Parameters) |
| Intra-pulse | 2D-CNN on Spectrograms | 77% (2000 Parameters) |
| Intra-pulse | LSTM on Raw Signals | 70% (5000 Parameters) |
| Intra-pulse | 2D-CNN + LSTM on Spectrograms | 88% (5000 Parameters) |

Accuracy calculated based on Categorical Cross-Entropy (Softmax) loss function.

Figure 5B:
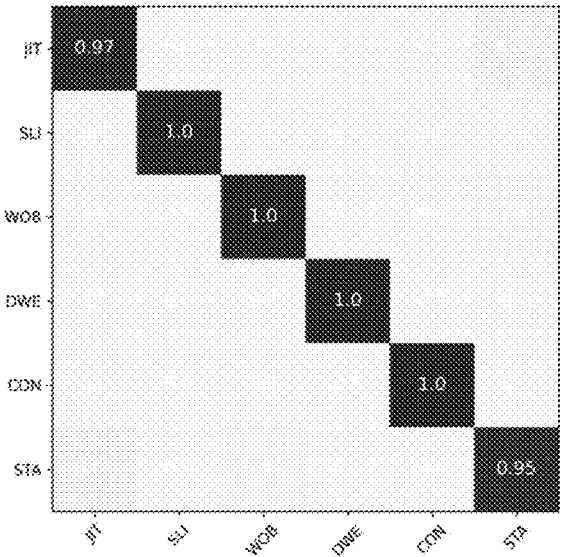

For the inter-pulse signals fixed point Feedforward Neural Network (FP-FFNN) works in high accuracy. FIG. 5B shows the confusion matrix for inter-pulse signal. According to the test, inter-pulse dataset trained with 300 parameters and target accuracy was obtained as 98%.

In preferred embodiment of the disclosure, signal labeling process have been occurs with the support of the computing unit (10). With this step, since labelling and access to data is a known difficulty in the field, restriction have been made for batch to 100 signals per class, 60 of 100 were used for training, 20 of 100 for validation, and 20 of 100 for testing.

2. Simulation and Results

According to the method with the data augmentation step and apparatus (A), with the support of the augmentation unit (42) accuracy increased for both 2D-CNN and 2D-CNN+ LSTM hybrid algorithm. Table 2 shows the accuracy results with comparisons between with and without data augmentation.

TABLE 2

| Data Augmentation | 2D-CNN + LSTM on Spectrograms | 2D-CNN on Spectrograms |
| --- | --- | --- |
| No | 88% | 77% |
| Yes | 98% | 99% |
| Run time (500 simulations) | 7 hours | 4 hours |

3. Simulation and Results

According to the one embodiment of the disclosure, 1 extra dimension added to the dataset with different parameters with the STFT algorithm for data augmentation. optimum balance between resolution and input size while keeping accuracy high found at 2145 pixels.

According to the method and apparatus (A) that runs the method, spectrograms have been extracted from the raw signal data. After this step, the data augmentation process occurs. 2D-CNN trained according to parameters on the table 3.

TABLE 3

| Parameter | Value |
| --- | --- |
| Model Parameters | 5000 parameters (19 kB) |
| Train - Test - Validation | 0.6 - 0.2 - 0.2 |
| Learning Rate | 0.003 |
| Training Epochs | 150 |
| Save Best Results | True |
| Batch Normalization | True |

Figure 6:
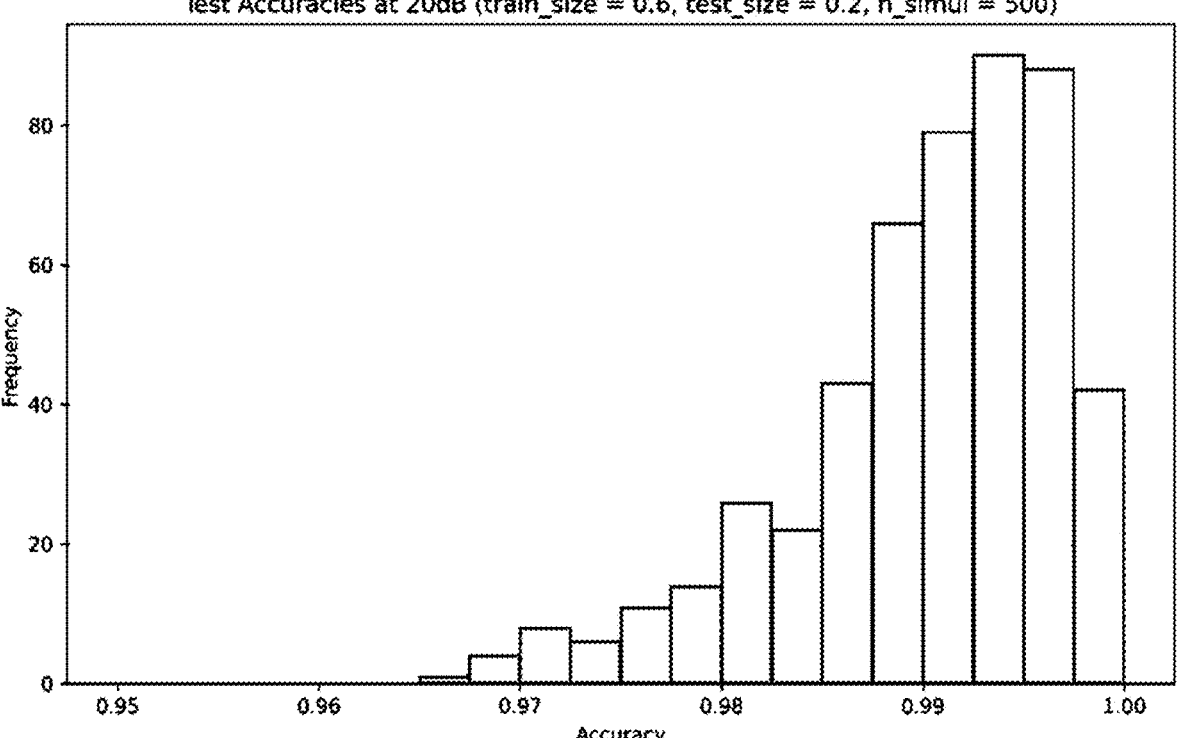
FIG. 6 illustrates a histogram of accuracy for a test results of CNN with data augmentation at 20 dB.

FIG. 6 shows the histogram of accuracy ad 20 dB for the above parameters (2D-CNN).

According to the disclosure simulation repeated 500 times with different k-folds, 99% average and median accuracy obtained on the test set. In the worst case (fold that led to the highest test loss), the model reached above 96% average accuracy.

According to the method and the apparatus (A) comprises a decision unit (100) that configured to selecting one of the accuracy module (20) and general module (30) for increase the accuracy according to the signal-to-noise ratio (SNR) level. Accuracy module (20) that enables to performing 2D-CNN on Spectrograms (the dataset version that includes time-frequency spectrogram that accomplished by the transform unit (41).) and general module (30) that performs 2D-CNN with LSTM on Spectrograms (the dataset version that includes time-frequency spectrogram that accomplished by the transform unit (41)).

Figure 7:
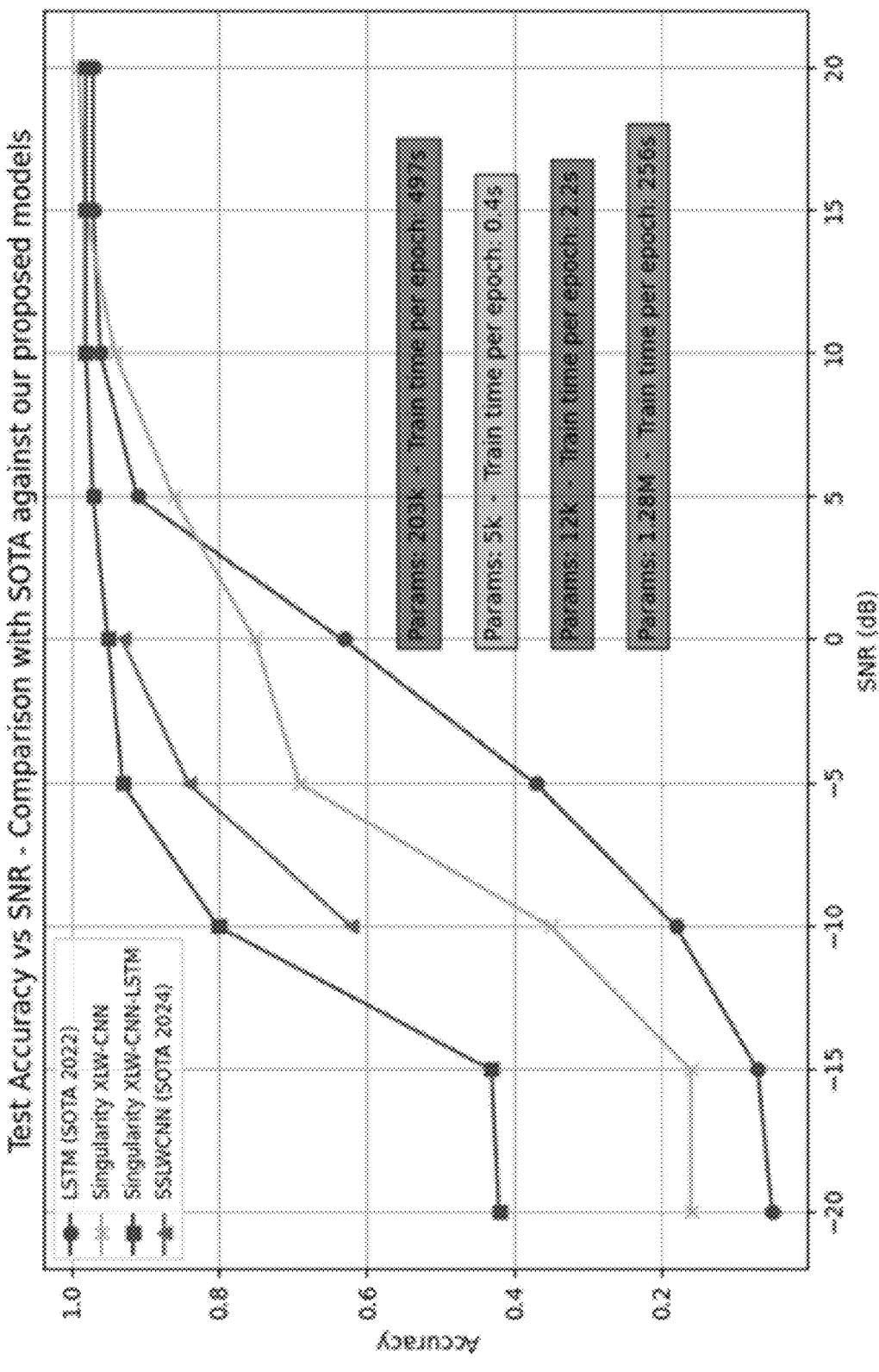
FIG. 7 shows comparison of performance of the methods between mentioned one in the disclosure and state of the art.

FIG. 7 shows comparison between results of state-of-the-art techniques and above-mentioned accuracy module (20) and general module (30) results. So, according to the results method and apparatus (A) works more accurate. Bellow the 15 dB and/or 20 dB noise general module (30) that performs 2D-CNN with LSTM on Spectrograms works more accurate. Above the 20 dB noise Accuracy module (20) that enables to performing 2D-CNN on Spectrograms increases accuracy.

The apparatus (A) comprises a human interface unit (60) that can project the detected signals with the computing unit (10) and forwards the inputs that related to the signal-to-noise level as threshold value to the decision unit (100).

In a preferred embodiment of the apparatus (A), comprises at least one human interface unit (60) that can provides the results to at least one real person. Also, mentioned human interface unit (60) enables the manual selection between accuracy module (20) and general module (30) according to the noise level. Another embodiment of the apparatus (A).

The method and apparatus (A) of the present disclosure can be applicable to any computation system with configurations as set out above. The at least one computing unit (10) executes the two different algorithms with controlled selection between them. In preferent embodiment, mentioned computing unit (10) may be at least one photonic processor, quantum processor, classical processor like CPU or GPU or TPU. Analysis managed based on image that converted/ received and represents modulated signal and method and apparatus (A) that deploys to the method creates results to the user(s).

The invention claimed is:

1. A computer-implemented method for automatic modulation recognition that enables the detection and identification of modulation schemes in received raw signals with a signal receiving unit without prior information about the raw signal detail, comprising at least one computing unit configured to achieve following steps:
   transforming received raw signals from time domain to frequency domain including the noise in the signal with segmenting the signal and computing its modulation in multiple images with the spectrogram extraction process in order to capture temporal dependencies and sequential information by treating the raw signals received from signal receiving unit as images;
   augmentation of the data for increasing the dataset size for increasing the accuracy with the limited data;
   training the data for enabling the network to learn spatiotemporal relationships based on a predefined or a precalculated signal-to-noise ratio (SNR) level; and
   applying the data to one algorithm of two, which are at least one-dimension convolutional neural network (CNN) and at least one-dimension convolutional neural network (CNN) long short-term memory network (LSTM) hybrid algorithm.

2. The computer-implemented method according to claim 1, further comprising time-frequency spectrogram conversation established with Cohen's Time Frequency Transform (CTFT) mitigate the signal noise during preprocessing for obtaining the spectrogram of the digital signal of the modulated pulse.

3. The computer-implemented method according to claim 1, further comprising time-frequency spectrogram conversation established with Choi-Williams distribution (CWD) to provide optimized time-frequency representation.

4. The computer-implemented method according to claim 1, wherein at least one of the two algorithms, which at least one-dimension convolutional neural network (CNN) and at least one-dimension convolutional neural network (CNN)

long short-term memory network (LSTM) hybrid algorithm, is tensorized to compress the model size within the memory medium.

5. The computer-implemented method according to claim 4, wherein tensorizing the convolutional neural network algorithm with factorizing weight tensors to a classification layer of the convolutional neural network, thereby generating an improved convolutional neural network.

6. The computer-implemented method according to claim 4, wherein tensorizing hidden layers of RNN and modifying to LSTM integrated with the tensorized CNN for providing compressed model.

7. The computer-implemented method according to claim 1, wherein the control unit employs principal component analysis for transfer learning and dimensionality reduction where insufficient labelled samples in the dataset, and outlier data detection analysis as accuracy per sample versus sample number before the data augmentation.

8. The computer-implemented method according toe claim 1, wherein the data augmentation is applied through transformation in frequency axis for preservation of temporal structure that targets the detected outlier data.

9. An apparatus for automatic modulation recognition that enables the detection and identification of modulation schemes in received signals with a signal receiving unit without pre-defined prior information about the signal details comprising:
   at least one at least one signal receiving unit that receives the raw signals, and at least one computing unit that coupled to at least one memory medium;
   a transform unit that transforms the raw signals from time domain to frequency domain with Cohen's Time Frequency Transform (CTFT) with combining Cohen's Class; and
   at least one augmentation unit that enlarges of the data for increasing the dataset size for increasing the accuracy with the limited data;
   wherein the computing unit also includes:
   an accuracy module configured to train the data for enabling the network to learn spatiotemporal relationships with treating the signals as images that applies two-dimensional convolutional neural network (2D-CNN) model;
   a general module configured to capture temporal dependencies and sequential information on the spectrogram that applies two-dimensional convolutional neural network (2D-CNN) and long short-term memory network (LSTM) hybrid algorithm; and
   a decision unit configured to selecting one of the accuracy module and general module for increase the accuracy according to the signal-to-noise ratio (SNR) level which is predefined input of the apparatus.

10. An apparatus according to claim 9, further comprising a human interface unit that can project the detected signals with the computing unit and forwards the inputs that related to the signal-to-noise level as threshold value to the decision unit.

11. An apparatus according to claim 9, further comprising photonic architecture computing unit which located on a photonic circuit.

12. An apparatus according to claim 9, further comprising signal receiving unit configured to receiving RADAR signals, which are contains modulation in pulses and received as over-the-air.

13. An apparatus according to claim 9, further comprising at least one classical computer that includes a processor that initialized the data and at least one quantum device that communicated the classical computer and includes at least one quantum processor as a computing unit.

* * * * *